M. C. RICE.
MOWING ATTACHMENT FOR AUTOMOBILES.
APPLICATION FILED FEB. 26, 1917.

1,295,925.

Patented Mar. 4, 1919.
2 SHEETS—SHEET 1.

Inventor
Matthew C. Rice.

By W. F. Davidson
Attorney

M. C. RICE.
MOWING ATTACHMENT FOR AUTOMOBILES.
APPLICATION FILED FEB. 26, 1917.

1,295,925.

Patented Mar. 4, 1919.
2 SHEETS—SHEET 2.

Inventor
Matthew C. Rice
By W. F. Davidson
Attorney

UNITED STATES PATENT OFFICE.

MATTHEW C. RICE, OF KANSAS CITY, MISSOURI.

MOWING ATTACHMENT FOR AUTOMOBILES.

1,295,925.  Specification of Letters Patent.  Patented Mar. 4, 1919.

Application filed February 26, 1917. Serial No. 150,982.

*To all whom it may concern:*

Be it known that I, MATTHEW C. RICE, a citizen of the United States, residing at Kansas City, in the county of Jackson and State of Missouri, have invented certain new and useful Improvements in Mowing Attachments for Automobiles, of which the following is a full, clear, and exact description, such as will enable others skilled in the art to which it appertains to make and use the same.

The invention relates to mowing attachment for automobiles and seeks to provide means whereby power of an automobile may be utilized to run the mowing mechanism.

An object of the invention is to so construct a frame with a mowing machine mounted thereon that can be almost instantly attached or detached with comparative ease.

Another object of the invention is to construct a mowing machine frame to be attached to an automobile whereby the mowing machine when not in use, or being transported from one place to another, it may be folded into a convenient position over the front part of the frame attached to the automobile and will occupy nothing more than superfluous space, being completely out of the way when in the most congested street traffic.

Another object of the invention is to provide means whereby the driving mechanism of the frame may be easily thrown out of gear with the driving mechanism of the automobile.

With these and other objects in view the invention consists in the combinations and arrangements of parts hereinafter described and more particularly pointed out in the appended claims, an application of the invention being illustrated in the accompanying drawings in which:—

Fig. 7, is a sectional view taken on line 6—6 of Fig. 6 showing the gear and ratchet attachment mounted upon a fragment of the brake shell.

Figure 1:
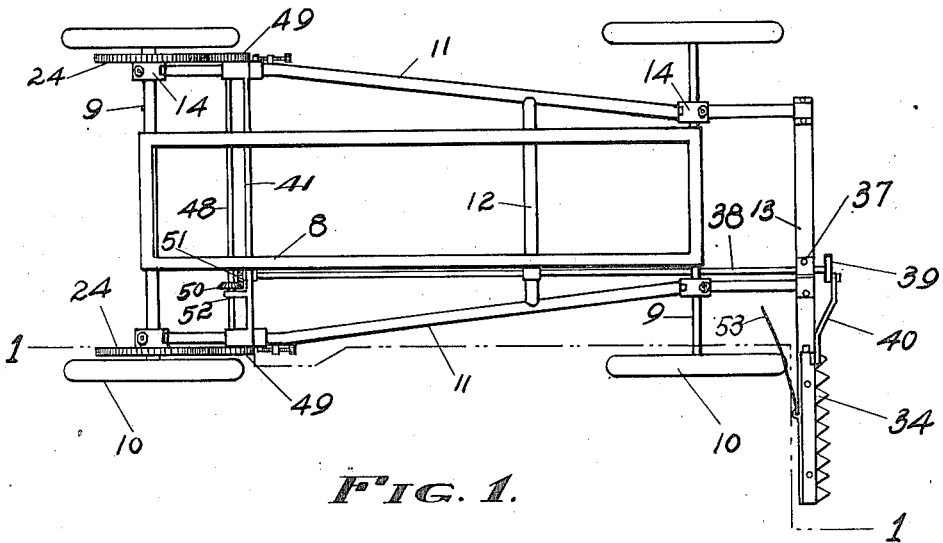
Figure 1, is a plan view of an automobile chassis with the improved mowing mechanism and attaching frame and the mechanism thereto shown ready for operation.
Figure 2:
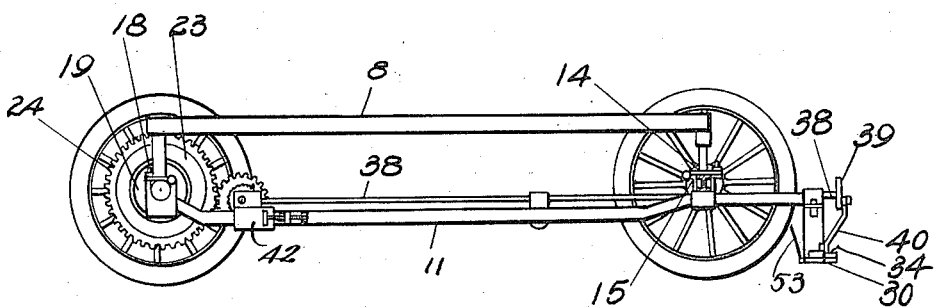
Fig. 2, is a sectional view in elevation taken on line 1—1 of Fig. 1.

The chassis 8, axles 9 and wheels 10 are of ordinary construction shown in Fig. 1 with the body of the automobile removed to show the manner of securing the detachable frame, consisting of side members 11 and cross members 12 and 13, to the axles 9 by the hinged plates 14.

Mounted on the side members 11 are the clamp members 15 provided with slots therein to receive the axles 9, one side of the clamp members rising upward forming bosses 16 to secure the hinged plates 14 thereto, and the opposite sides of said bosses provided with studs 31 to receive one end of the plates 14 secured to the clamp members 15 by the nuts 17.

Bushings 18 are tightly driven onto the brake shells 19 and are provided with slots 20 to receive the ratchet dogs 21 one end of which is secured between the side plates 22 integral with bushings 18 and the side plates 23 secured to the sides of the bushings.

Gears 24 are revolubly mounted upon the bushings 18 and are provided with ratchet teeth 25 arranged to engage the ratchet dogs 21 which are held in engage positions by the springs 27 inserted between the bushings 18 and the ratchet dogs 21.

Bosses 28 mounted upon the forward end of the side frame members 11 are arranged to support the cross member 13 by bolts 29.

Mowing knife 30 is hinged at 33, is provided with mowing knife 34 mounted on the top thereof and arranged to slide to and fro. Lugs 35 are arranged to limit the downward movement of the mowing knife 30 and lugs 36 are arranged to limit the downward movement of the hinged member 32 whereby the mowing machine is held at the necessary height above the ground for mowing purposes.

Journal box 37 is mounted upon the cross member 13 receiving shaft 38 and provided with a disk 39 mounted upon one end of said shaft. Connecting rod 40 connects the disk 39 and the mowing knife 34 and is arranged to reciprocate the mowing knife 34 when the shaft 38 is revolved.

Sliding frame member 41 is provided with bosses 42 arranged to slide upon the side members 11 and having lugs 43 integral therewith.

Extending outward from the side members 11 are lugs 44 adapted to receive the set screws 45 which are locked in any desired position by lock nuts 46.

Shaft 48 mounted in the frame 41 and extending beyond the bosses 42 is provided with pinions 49 and bevel gear 50 rigidly mounted on the shaft 48, bevel gear 50 meshing with bevel gear 51 mounted on the shaft 38, and pinions 49 meshing with gears 24. Close to bevel gear 50 is a journal bearing 52 integral with sliding frame 41 and adapted to support the shaft 48 and hold the bevel gears 50 and 51 in mesh, the frame 41 extending across the frame of the automobile and being integral with bosses 42.

To attach the device to an automobile the rear wheels are removed and bushings 18 are tightly driven on the brake shells 19, the wheels replaced, the frame secured to the axles by raising it and inserting the axles 9 into the slots of the clamp members 15 and clamping the hinged plates 14 over the axles by the studs 31 and nuts 17.

In operation the gears 24, mounted upon the ratchet bushings 18, are arranged whereby the automobile in turning curves will cause the mowing machine to receive the full driving force of the rear wheel turning the largest radius, and the gear 24 on the opposite wheel will turn on its respective bushing and allow the ratchets to escape the ratchet teeth therein thereby making a positive drive.

When it is desired to pass over a portion of grass with the mowing machine in operation and not mow the grass, cord 53 attached to the mowing knives and connected in any convenient manner to the automobile (not shown in the drawings) is pulled raising the mowing knives high enough to pass over the ground without disturbing the grass.

Figure 3:
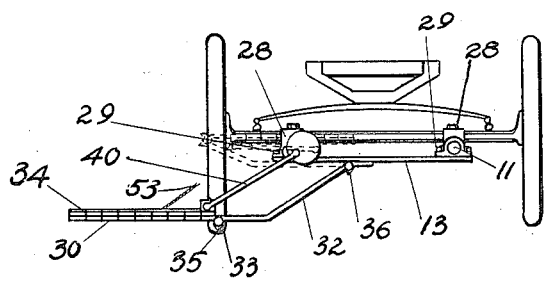
Fig. 3, is an end view of Fig. 1 and also showing the mowing machine in dotted lines folded over one end of the attaching frame.
Figure 4:
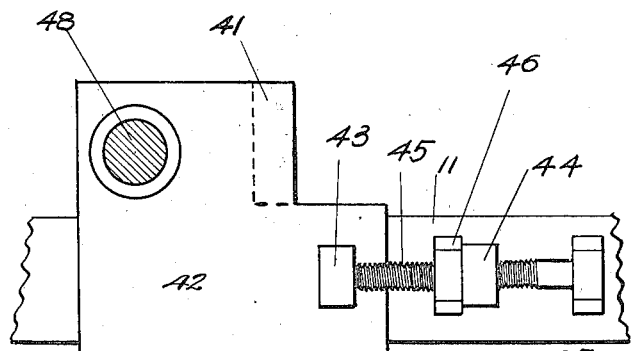
Fig. 4, is an enlarged fragmentary view showing the sliding arrangement to engage and disengage the mechanism on the frame with the driving mechanism of the automobile.
Figure 5:
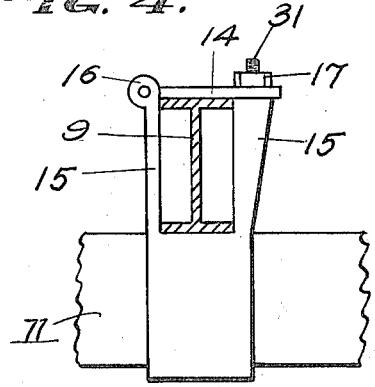
Fig. 5, is an enlarged fragmentary view illustrating the simple manner in which the mowing machine frame may be easily attached or detached to the ordinary automobile.
Figure 6:
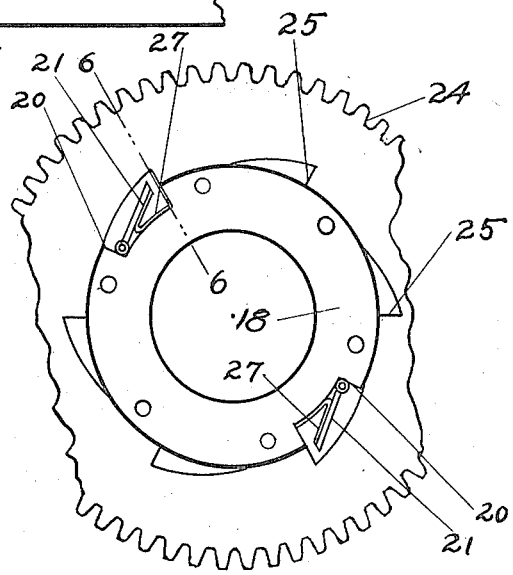
Fig. 6, is an enlarged fragmentary view showing the gear attachment and ratchet mounted on the brake shell of an automobile.

When it is desired to run the automobile from place to place with the mowing machine attached, the mowing knives are folded over the frame 13 as shown in dotted lines in Fig. 3, the pinions 49, shaft 48, shaft 38, bevel gears 50 and 51 are slid forward with the sliding frame 41 by the adjusting of the set screws 45 disengaging the pinions 49 from the gears 24 and leaving only the ordinary automobile mechanism and gears 24 in operation.

What I claim as new, and desire to secure by Letters Patent, is:—

1. A pair of long frame members, said frame members secured together by a cross member, clamps near the front and rear of each of said members and secured thereto to detachably connect said frame members to the front and rear axles of an automobile, gears mounted on the brake drums of the automobile, a cross frame provided with bosses to slide on said frame members, a shaft mounted in said sliding cross frame, a pinion mounted on each end of said shaft to engage with the respective gear on the brake drum, set screws to slide said sliding frame and engage and disengage said pinions with said gears, a bevel gear mounted on said shaft, a longitudinally disposed shaft journaled in said cross member, a front cross member secured to the front of said frame, said second shaft slidably journaled in said front cross member, a gear on said second shaft meshing with said gear on said first shaft, an eccentric on the opposite end of said second shaft, a mower bar attached to said front cross member provided with a sliding knife, and a connecting rod connecting said eccentric and said sliding knife.

2. A pair of frame members, clamps near the front and rear of each of said members and secured thereto to detachably connect said frame members to the front and rear axles of an automobile, gears connected to the rear wheels of the automobile, a cross frame provided with bosses connecting said frame members, a front cross member connecting the front ends of said frame members, a shaft journaled in said cross frame and said front cross frame member, a shaft mounted in said cross frame member provided with bosses, pinions secured to said shaft connecting said gears mounted on said rear wheels with said last mentioned shaft, intermeshing gears connecting said last mentioned shaft with said first mentioned shaft, a mower bar attached to said front cross member, sliding knives in said mower bar and mechanism connecting said first mentioned shaft with said mower bar to operate said knives.

MATTHEW C. RICE.